(12) United States Patent
Lehnert

(10) Patent No.: US 12,101,591 B2
(45) Date of Patent: Sep. 24, 2024

(54) DYNAMIC EARBUD PROFILE

(71) Applicant: Sonos, Inc., Santa Barbara, CA (US)

(72) Inventor: Hilmar Lehnert, Framingham, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/451,451

(22) Filed: Aug. 17, 2023

(65) Prior Publication Data

US 2024/0187777 A1 Jun. 6, 2024

Related U.S. Application Data

(63) Continuation of application No. 17/833,551, filed on Jun. 6, 2022, now Pat. No. 11,825,262, which is a
(Continued)

(51) Int. Cl.
*H04R 1/10* (2006.01)
*G06F 3/01* (2006.01)
(Continued)

(52) U.S. Cl.
CPC .......... *H04R 1/1041* (2013.01); *G06F 3/017* (2013.01); *G06F 3/041* (2013.01); *G06F 3/165* (2013.01);
(Continued)

(58) Field of Classification Search
CPC ......... H04R 1/104; G06F 3/017; G06F 3/041; G06F 3/165; G10L 25/51
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 200153994 7/2001
WO 2003093950 A2 11/2003

OTHER PUBLICATIONS

AudioTron Quick Start Guide, Version 1.0, Mar. 2001, 24 pages.
(Continued)

*Primary Examiner* — Simon King
(74) *Attorney, Agent, or Firm* — Akerman LLP

(57) ABSTRACT

Embodiments disclosed herein include a headphone device which operates in various modes applying different gesture profiles based on various operational, playback, or environmental conditions. An example headphone device includes a first earbud and a second earbud communicatively coupled to each other. One or both of the earbuds include a touch-sensitive interface and a processor. The earbuds are configured to interpret a first set of gestures to the touch-sensitive interface as respective commands while operating in a first mode. Upon detecting a change in an operational condition, one or both earbuds transition to a second mode where the earbuds are configured to interpret a second set of gestures to the touch-sensitive interface as respective commands, different from the respective commands correlating to the first set of gestures to the touch-sensitive interface.

20 Claims, 10 Drawing Sheets

Related U.S. Application Data continuation of application No. 17/189,010, filed on Mar. 1, 2021, now Pat. No. 11,356,764.

(60) Provisional application No. 62/984,495, filed on Mar. 3, 2020.

(51) Int. Cl.
*G06F 3/041* (2006.01)
*G06F 3/16* (2006.01)
*G10L 25/51* (2013.01)

(52) U.S. Cl.
CPC ............ *G10L 25/51* (2013.01); *H04R 1/1016* (2013.01); *H04R 1/1025* (2013.01); *H04R 2420/07* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 10,194,259 | B1 * | 1/2019 | Martin .................. H04W 4/027 |
| 10,453,450 | B2 | 10/2019 | Boesen et al. |
| 10,757,491 | B1 * | 8/2020 | Jackson .................. H04R 1/02 |
| 11,573,763 | B2 * | 2/2023 | Boesen .................. G10L 15/22 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2018/0048750 | A1 * | 2/2018 | Hardi .................... H04L 65/612 |
| 2018/0277123 | A1 * | 9/2018 | Boesen ................ H04R 1/1041 |
| 2021/0081163 | A1 * | 3/2021 | Buckley .................. H04R 1/10 |
| 2021/0377648 | A1 * | 12/2021 | Tome .................. H04R 1/1016 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Feb. 16, 2023, issued in connection with U.S. Appl. No. 17/833,551, filed Jun. 6, 2022, 7 pages.
Notice of Allowance mailed on Feb. 1, 2022, issued in connection with U.S. Appl. No. 17/189,010, filed Mar. 1, 2021, 9 pages.
Notice of Allowance mailed on Jun. 16, 2023, issued in connection with U.S. Appl. No. 17/833,551, filed Jun. 6, 2022, 9 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

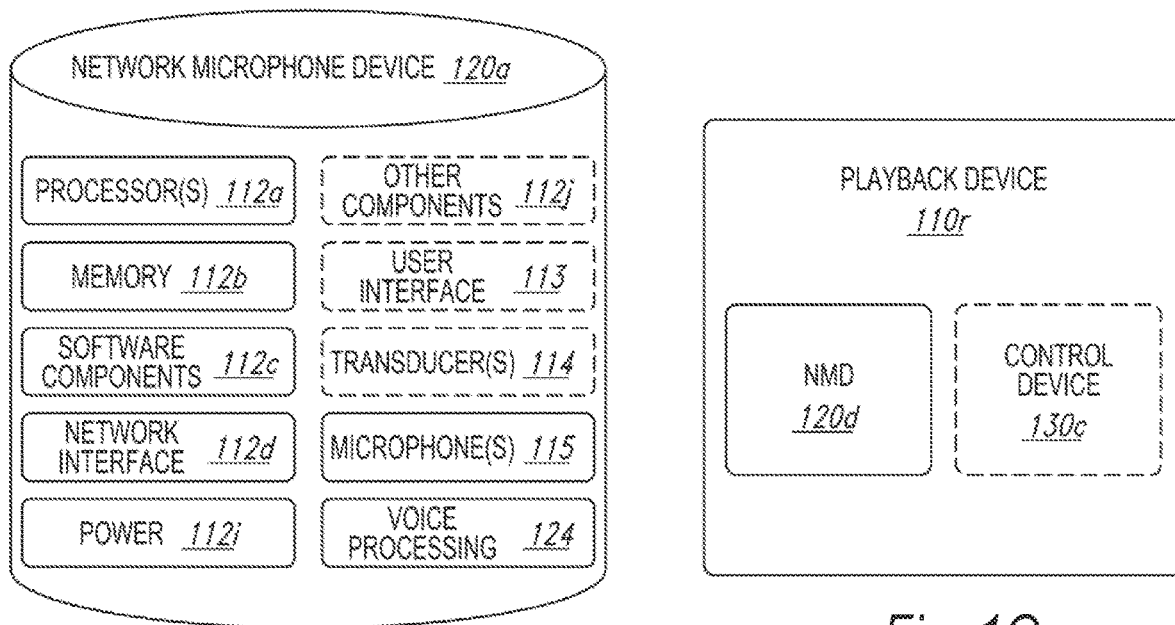
Fig. 1F
Fig. 1G
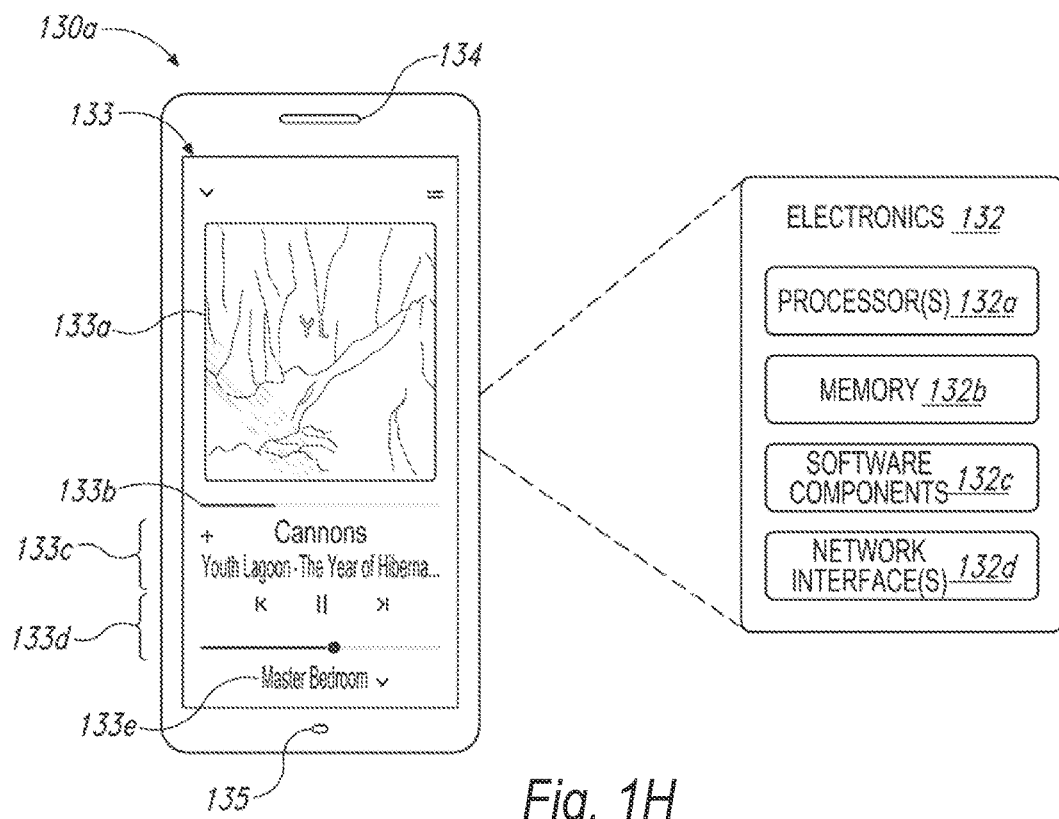
Fig. 1H

| Gesture Profile | One Tap | Two Taps | Three Taps | Tap-and-Hold |
|---|---|---|---|---|
| Single Earbud Mode | Play/Pause Toggle | Skip Forward | Skip Backwards | Activate Voice Assistant |
| Double Earbud Mode | Enable/Disable ANC (or ANR) Toggle | Play/Pause Toggle | Skip Forward | Activate Voice Assistant |

| Gesture Profile | One Tap | Two Taps | Three Taps | Tap-and-Hold |
|---|---|---|---|---|
| Music Mode | Enable/Disable ANC (or ANR) Toggle | Play/Pause Toggle | Skip Forwards | Activate Voice Assistant |
| Spoken Word Mode | Play/Pause Toggle | Scan Forward | Scan Backwards | Activate Voice Assistant |

| Gesture Profile | One Tap | Two Taps | Three Taps | Tap-and-Hold |
|---|---|---|---|---|
| Music Mode | Enable/Disable ANC (or ANR) Toggle | Play/Pause Toggle | Skip Forward | Activate Voice Assistant |
| Video Mode | Play/Pause Toggle | Scan Forward | Scan Backwards | Activate Voice Assistant |

*Fig. 4C* — 460c

| Gesture Profile | One Tap | Two Taps | Three Taps | Tap-and-Hold |
|---|---|---|---|---|
| First Source Mode | Enable/Disable ANC (or ANR) Toggle | Play/Pause Toggle | Skip Forward | Activate Voice Assistant |
| Second Source Mode | Play/Pause Toggle | Scan Forward | Scan Backwards | Activate Voice Assistant |

*Fig. 4D* — 460d

| Gesture Profile | One Tap | Two Taps | Three Taps | Tap-and-Hold |
|---|---|---|---|---|
| Mobile Device Pairing Mode | Enable/Disable ANC (or ANR) Toggle | Play/Pause Toggle | Skip Forward | Activate Voice Assistant |
| Computing Pairing Mode | Enable/Disable ANC (or ANR) Toggle | Play/Pause Toggle | Scan Forward | Scan Backwards |

| Gesture Profile | One Tap | Two Taps | Three Taps | Tap-and-Hold |
|---|---|---|---|---|
| Playback Zone Grouping Mode | Play/Pause Toggle | Mute Other Devices in Zone Toggle | Skip Forward | Activate Voice Assistant |
| Wearable Playback Device Grouping Mode | Play/Pause Toggle | Synchronize Playback of Paired Wearable Playback Devices | Skip Forward | Activate Voice Assistant |

DYNAMIC EARBUD PROFILE

CROSS-REFERENCE TO RELATED APPLICATIONS

This application is a continuation of U.S. application Ser. No. 17/833,551, titled "Dynamic Earbud Profile," filed on Jun. 6, 2022, which is a continuation of U.S. application Ser. No. 17/189,010, entitled "Dynamic Earbud Profile," filed on Mar. 1, 2021, and Issued as U.S. Pat. No. 11,356,764 on Jun. 7, 2022, which claims priority to U.S. Provisional App. 62/984,495, entitled "Dynamic Earbud Profile," filed on Mar. 3, 2020. The contents of these applications are incorporated herein by reference their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIG. 4A is a chart of a gesture profile, according to an example embodiment.

FIG. 4B is a chart of a gesture profile, according to an example embodiment.

FIG. 4C is a chart of a gesture profile, according to an example embodiment.

FIG. 4D is a chart of a gesture profile, according to an example embodiment.

FIG. 4E is a chart of a gesture profile, according to an example embodiment.

FIG. 4F is a chart of a gesture profile, according to an example embodiment.

Figure 1A:
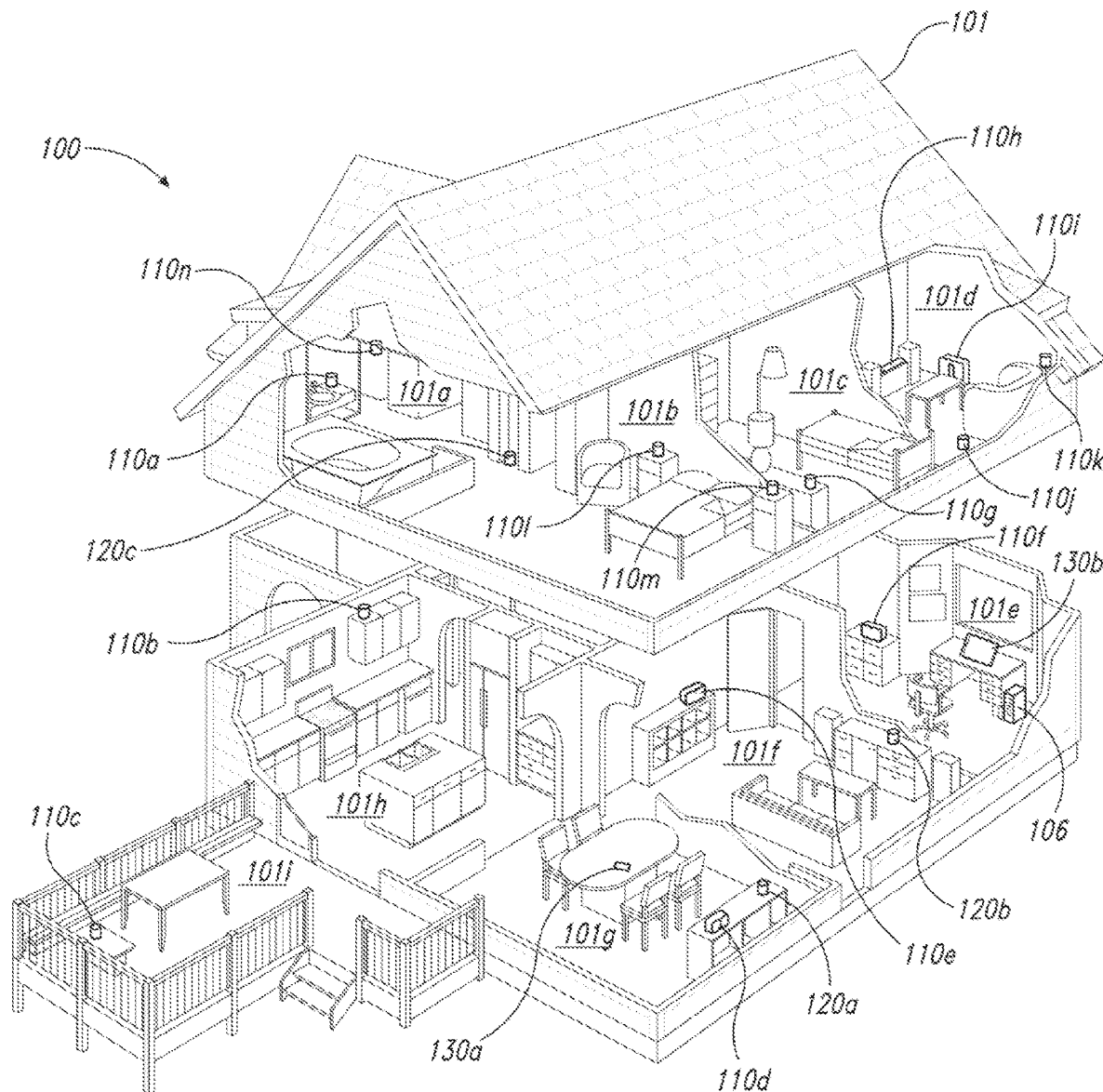
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to a smart wearable playback device (e.g., wireless headphones or earbuds) that may enable one of multiple dynamic profiles depending on various modes of operation. Since wearable playback devices are designed to be comfortable (i.e., light and small), they often have limited physical user interfaces since there simply isn't space on the housings to place buttons and the like. For instance, some wireless earbuds have a touch surface on each bud, which the user can provide input via code (e.g., tap, double tap, tap-and-hold, etc.). This issue is further aggravated by the desire to make the user interface symmetrical between right and left so that a user can use a single earbud (while charging the other).

To address this issue, the disclosed wearable playback device may switch between operating in a variety of modes based on various operational, playback, or environmental conditions, which allows the playback device to change functionality without necessarily invoking a user interface. For instance, the different operating conditions may include whether the user is wearing one earbud or both. Additionally, the different environmental conditions may include a pairing status with various control and/or source devices, such as a smartphone, a computer, and/or a television. Further, the different playback conditions may include playing back different types of audio content or playback different audio content from various sources. Many other examples of operating, environmental, and playback conditions are possible.

As noted above, since there is limited physical space on wireless earbuds, leaving little to no space for buttons, different gestures on a touch-sensitive interface may correlate to different playback commands. By way of example, one tap on a touch-sensitive interface may correlate to toggling play and pause, two taps may correlate to a skip forward function, three taps may correlate to a skip backwards function, and a tap-and-hold may activate a voice assistant. This set of example command correlations may define a gesture profile.

In practice, a user may desire quick and easy access to various features based on different operational, playback, or environmental conditions. For example, the user may desire simpler access to the Active Noise Cancellation (ANC) or Active Noise Reduction (ANR) functions while listening to both earbuds as opposed to one earbud, as the user might not need easy access to the ANC or ANR functions while only using one earbud (since the user might prefer not to use ANR or ANC in this situation). In another example, a user may desire relatively simpler access to scanning forward and scanning backwards functions while listening to spoken word content (e.g., a podcast or audio book) or audio with associated video content as compared with music content, as the user is less likely to use those scanning functions while listening to music.

Accordingly, the wearable playback device is configured to detect changes in various operational, playback, and environmental conditions. Upon detecting a change in a condition, the headphone device may apply a different gesture profile corresponding to the new condition. By way of example, while listening to one earbud, the gesture profile may correlate a single tap on the touch-sensitive interface to toggling between play and pause functions. In this example, while listening to both earbuds, the gesture profile may correlate a single tap on the touch-sensitive interface to toggling between enabling and disabling ANC or ANR functions. Many other examples are contemplated herein.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers typically identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A.

Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1H.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
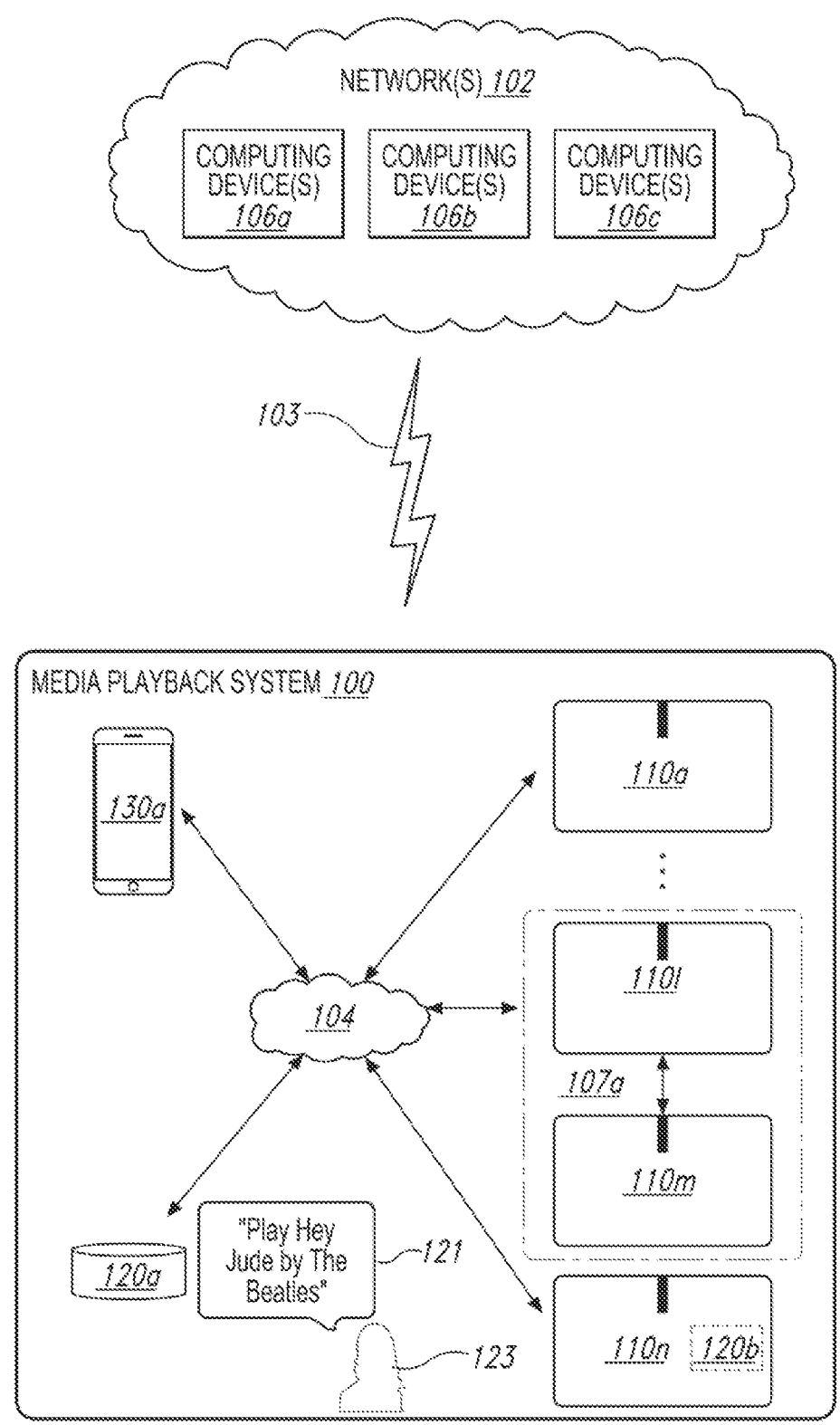
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/ or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, " " can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
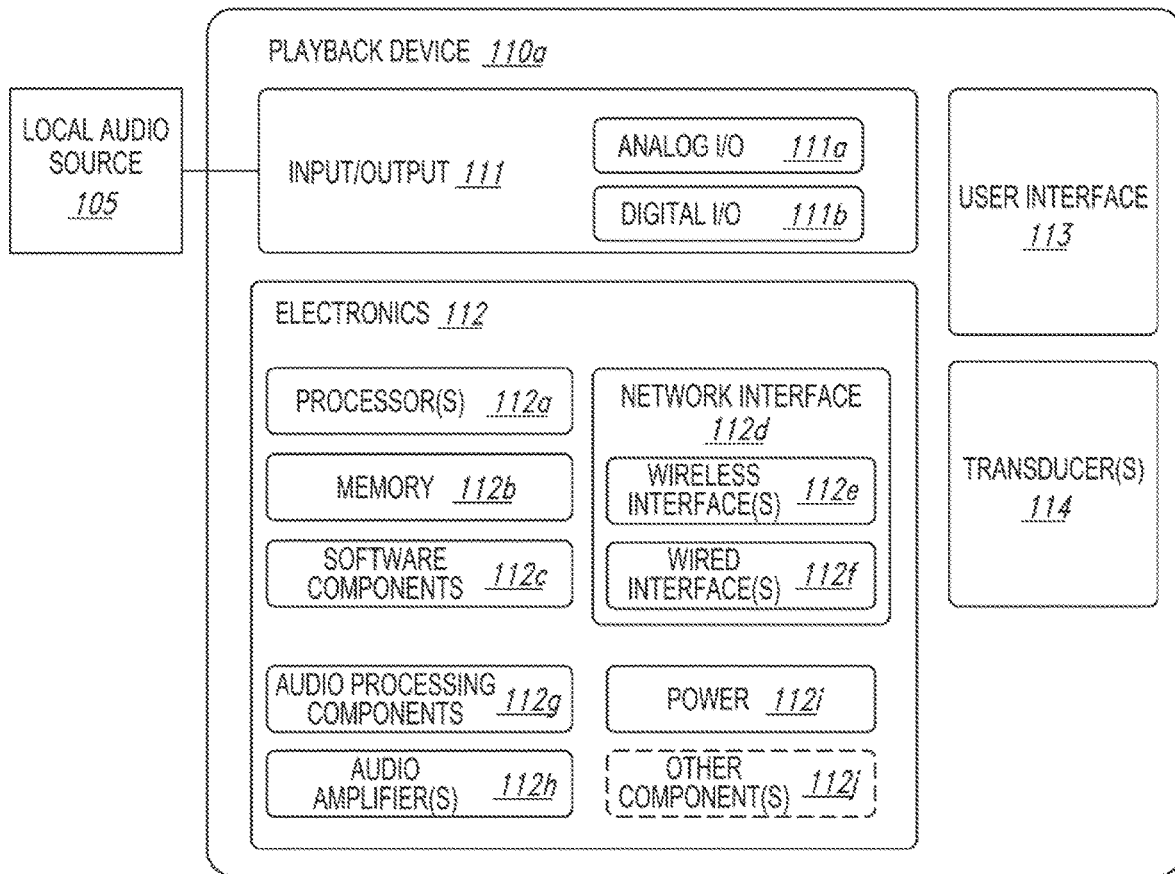
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive interfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
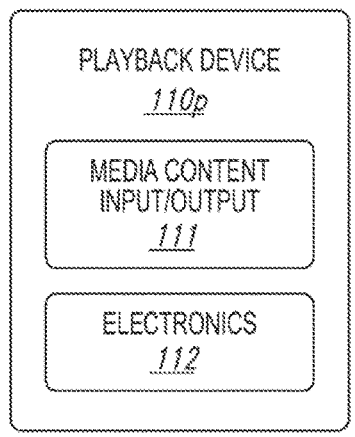
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
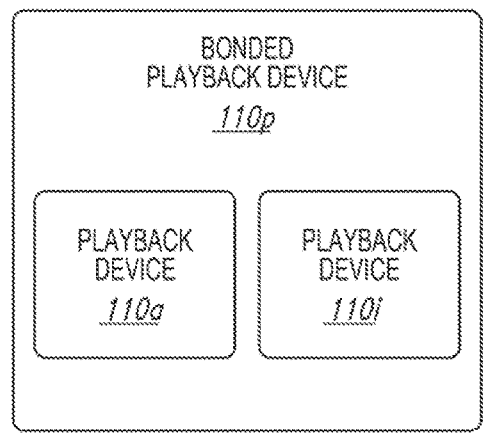
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

C. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IOT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 112a to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

III. Example Wearable Devices

In some embodiments, some example playback devices may be implemented as a wearable device. Aspects of the present disclosure relate to a wearable device (e.g., headphones or earbuds) that dynamically switches between profiles depending on various modes of operation. Namely, the disclosed wearable device may be configured to operate in a variety of modes based on one or more current operational, playback or environmental conditions.

Figure 2:
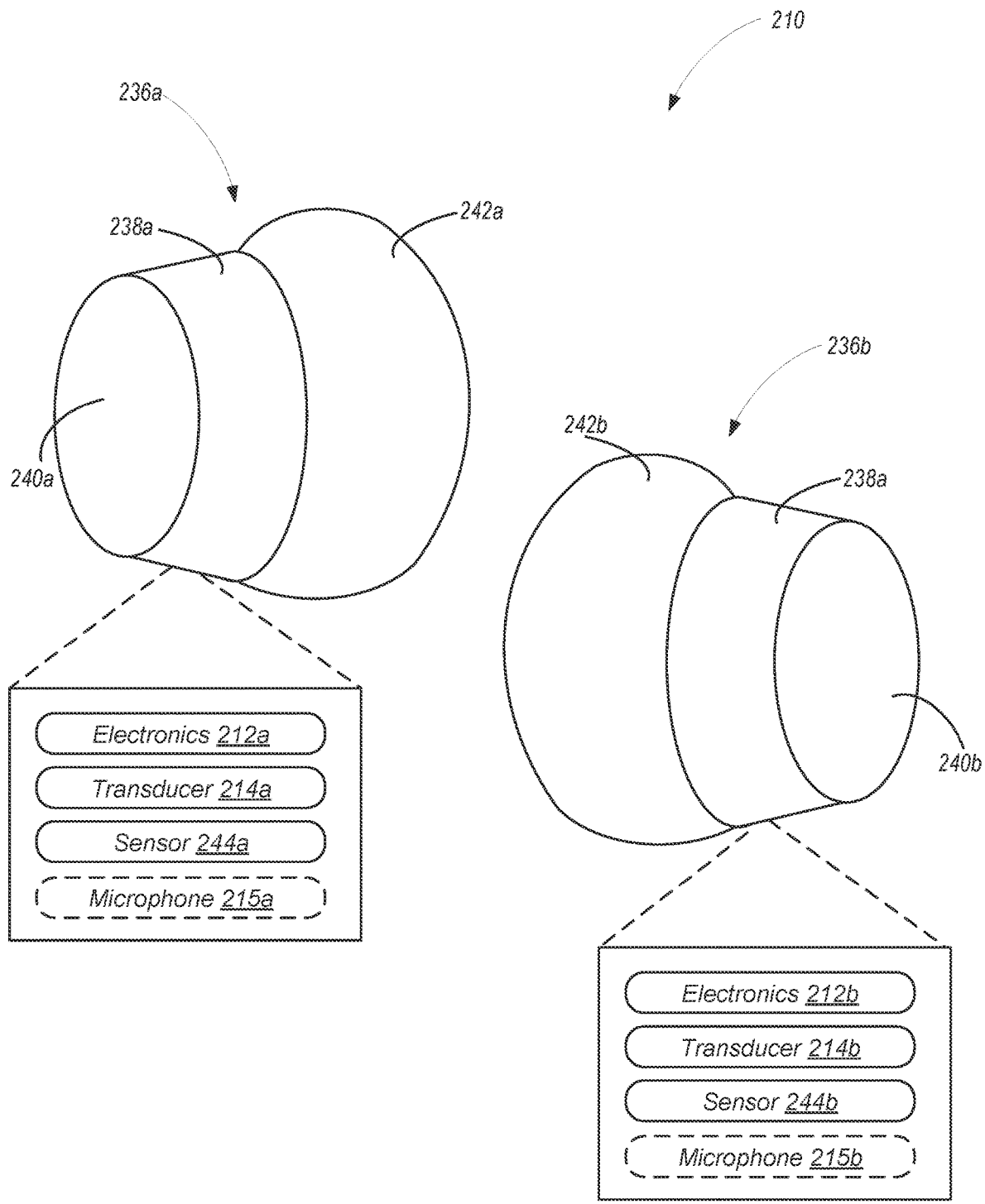
FIG. 2 is a schematic drawing of a headphone device, according to an example embodiment.

FIG. 2 shows an example wearable device 210. The wearable device may be a wearable playback device. The wearable playback device 210 includes a first earbud 236a and a second earbud 236b communicatively coupled to one another (referred to collectively as the earbuds 236). The earbuds 236a and 236b include respective housings 238a and 238b (referred to collectively as the housing 238). The housing 238a and 238b carry respective touch-sensitive interfaces 240a and 240b (referred to collectively as the touch-sensitive interface 240) and include respective earpieces 242a and 242b (referred to collectively as the earpieces 242) attached to the housings 238a and 238b, respectively. The housing 238a and 238b also carry respective sensors 244a and 244b (referred to collectively as the sensors 244), in addition to respective electronics 212a and 212b (referred to collectively as the electronics 212). In operation, the touch-sensitive interface 240a and 240b may be configured to transmit touch data representing one or more gesture gestures (e.g., one tap, two taps, tap and hold, etc.) to the electronics 212. Additionally or alternatively, the housing 238a and 238b may include mechanical buttons. In these embodiments, the mechanical buttons may be configured to transmit touch data representing one or more gesture gestures (e.g., one tap, two taps, tap and hold, etc.) to the electronics 212.

The electronics 212 may include components generally similar to the electronics 112 of the playback device 110 (FIG. 1C), albeit in a form configured for implementation in the earbuds 236. In particular, as compared with other playback devices not intended to be wearable, the electronics 212 of the wearable playback device 210 may include lower-power processor(s) 212a, less memory 212b, and lower power audio amplifier(s) 212h, among other examples. Further, different implementations of the wearable playback device 210 may have different kinds of electronics 212. For instance, a headphones implementation may allow for relatively more powerful electronics 212 as compared with earbuds implementation, given the larger form factor.

The earbuds 236a and 236b may be communicatively coupled to one another other to facilitate operation as a pair. For instance, the earbuds 236a and 236b may establish a communicative coupling to facilitate synchronous playback (e.g., playing left and right channels of stereo audio content, or playing the same content on both earbuds 236) as well as communicating playback commands received on one earbud to the other, among other examples. Additionally or alternatively, the earbuds 236a and 236b may be communicatively coupled to a control device, such as control device 130. In these examples, the control device 130 may facilitate synchronous playback (e.g., playing left and right channels of stereo audio content, or playing the same content on both earbuds 236). The control device 130 may also receive and communicate playback commands received on one earbud to the other.

To illustrate, the electronics 212a and 212b of each earbud 236a and 236b may include one or more antennas configured to wirelessly communicate with each other and/or one or more other devices via a wireless network (e.g., a network, a Bluetooth network, a Z-Wave network, a ZigBee network, a cellular network, and/or other suitable wireless communication protocol network). In some examples, the earbuds 236a and 236b may communicate with each other and/or one or more other devices via a wired network (e.g., a network comprising Ethernet, Universal Serial Bus (USB), and/or another suitable wired communication). Further, in some examples, the earbuds 236a and 236b may be wired and/or may be converted to and from wired earbuds 236a and 236b. In these examples, the earbuds 236a and 236b may communicate with each other via a wired communication link.

Further, in some embodiments, the wearable playback device 210 may communicatively couple to external devices, such as the control device 130a. The wearable playback device 210 may receive playback commands and/or audio data from the external devices. Communication channels between the wearable playback device 210 and external devices, such as the control device 130a, may include wireless network such as a WiFi network, a Bluetooth, a cellular network, a Z-Wave network, a ZigBee, and/or other suitable wireless communication protocol network.

In some example embodiments, the wearable playback device 210 may further include one or microphones, such as microphones 215. As shown in FIG. 2, the microphones 215 may be disposed within one or both earbuds 236a and 236b as microphones 215a and 215b. Further, the microphones 215 can operate as an NMD configured to receive voice input from a user and correspondingly perform one or more operations based on the received voice input, similar to the NMD 120a of FIG. 1F. Additionally or alternatively, the microphones 215 may be used to capture ambient sounds to be used for active noise cancellation (ANC) and/or active noise reduction (ANR).

As shown in FIG. 2, there may be limited physical space on the earbuds 236a and 236b, which leaves little to no space for buttons or other controls. To support multiple different playback controls, various gestures on the touch-sensitive interface 240a and 240b may correlate to different commands to the earbuds. By way of example, one tap on the touch-sensitive interface 240a and 240b may correlate to toggling play and pause, two taps may correlate to a skip forward function, three taps may correlate to a skip backwards function, and tap-and-hold may activate a voice assistant. This set of command correlations defines a particular gesture profile. When this gesture profile is active, the processors 112 are configured to interpret data indicating gestures received on the touch-sensitive interface 240a and 240b and cause the headphone device to perform a correlated playback function based on the gesture profile.

In some examples, the wearable playback device 210 may operate in different modes based on different operating, environmental, or playback conditions. Different operating conditions may include whether the user is wearing one or both earbuds 236a and 236b. Additionally, different environmental conditions may include pairing with different control devices. Further, different playback conditions may include playing back different types of audio content or playback different audio content from various sources. Many other examples of operating environmental, and playback conditions are possible.

In some examples, the wearable playback device 210 may detect whether a user is wearing one earbud 236a or both earbuds 236a and 236b by way of the sensor 244a and 244b. For example, during use (i.e., while a user is wearing the earbuds 236a and 236b), the sensors 244a and 244b may sense the presence of the user, perhaps via direct or indirect contact with the user. For instance, the sensors 244a and 244b may sense contact with the user as a certain range of capacitance values. Once a user takes the earbud 236a out, the sensor 244a no longer detects the user (e.g., the capacitance will no longer be within the range indicating that the user is wearing the earbud 236a).

Additionally or alternatively, the sensors 244a and 244b may be infrared sensor configured to detect whether the user is wearing the earbuds 236a and 236b. Further, in some examples, the microphones 215a and 215b may be configured to detect whether the user is wearing the earbuds 236a and 236b and/or work in conjunction with the sensors 244a and 244b to detect whether the user is wearing the earbuds 236a and 236b. Similarly, in some examples, the earbuds 236a and 236b may include accelerometers configured to detect whether the user is wearing the earbuds 236a and 236b and/or work in conjunction with the sensors 244a and 244b to detect whether the user is wearing the earbuds 236a and 236b. For example, the accelerometer may detect and recognize the motion of being taken out of the user's ear.

Upon detecting the user is no longer wearing the earbud 236a, the earbud 236a may transmit a message to the earbud 236b still in use indicating that earbud 236a is no longer in use. Additionally or alternatively, the earbud 236a may transmit a message to a paired control device 130a that it is no longer in use. The paired control device 130a may then transmit a message to the earbud 236b still in use that earbud 236a is no longer in use. Additionally or alternatively, the earbud 236b still in use may detect that the earbud 236a is no longer in use. For example, the earbud 236b still in use may determine that earbud 236a is no longer communicatively coupled to earbud 236b.

Figure 3:
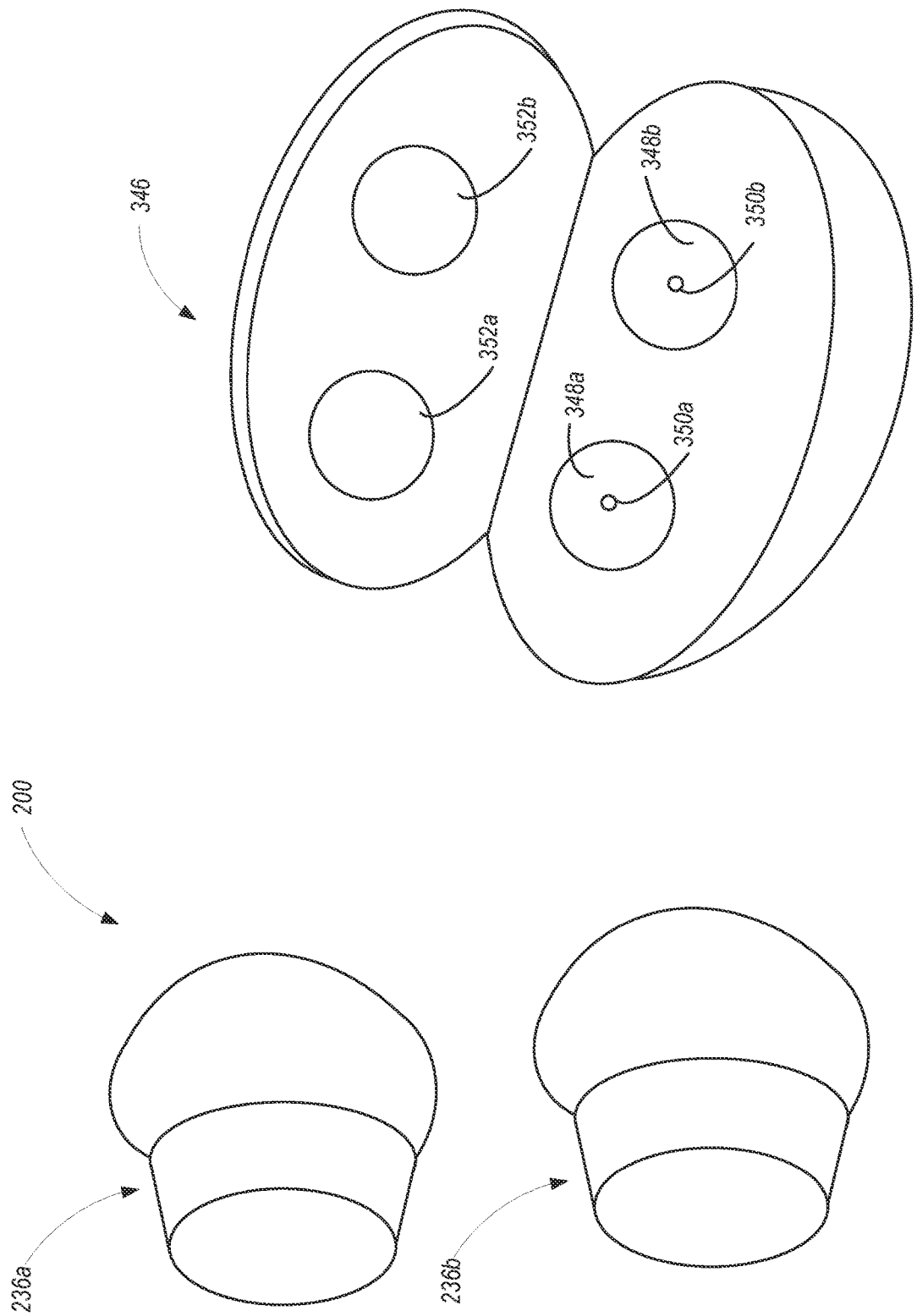
FIG. 3 is a schematic drawing of a headphone device and headphone case, according to an example embodiment.

In further examples, the wearable playback device 210 may detect whether a user is using the earbud 236a or both earbuds 236a and 236b by way of a case 346 (as shown in FIG. 3), which may be configured to charge the earbud 236a and/or the earbud 236b when the earbuds are in the case. Namely, the case 346 may be configured to detect when one or both of the earbuds 236a and 236b are placed in the case by way of a sensor or electrical connection (as further shown in FIG. 3).

Further, in some examples, one earbud 236a may be charging in the case 346 while the other earbud 236b is in use. In these examples, upon detecting the earbud 236a is in the case or charging, the earbud 236a may transmit a message to the earbud 236b still in use indicating that earbud 236a is no longer in use. Additionally or alternatively, the earbud 236a may transmit a message to a paired control device 130a that it is no longer in use. The paired control device 130a may then transmit a message to the earbud 236b still in use that earbud 236a is no longer in use.

FIG. 3 shows an example wearable playback device 210 with a headphone case 346, according to an example embodiment. The headphone case 346 includes at least one battery and a receptacle 348a and 348b for each earbud 236a and 236b. The receptacles 348a and 348b include sensors or electrical connections 350a and 350b for sensing and/or charging the earbuds 236a and 236b. Additionally, the headphone case 346 may include a power receptacle for charging a battery of the headphone case 346 and the earbuds 236a and 236b. Further, depending on the size, shape, and/or configuration of the earbuds 236a and 236b and/or case 346, the case 346 may include additional receptacles 352a and 352b to accommodate the earbuds 236a and 236b.

The wearable playback device 210 may detect whether a user is using one earbud 236a or both earbuds 236a and 236b by way of the case 346. Namely, the case may be configured to detect when one or both of the earbuds 236a and 236b are placed in the case 346 by way of the sensor or electrical connection 350a and 350b. Further, in some examples, one earbud 236a may be charging in the case while the other earbud 236b is in use. In these examples, upon detecting the earbud 236a is in the case or charging, the earbud 236a may transmit a message to the earbud 236b still in use indicating that earbud 236a is no longer in use.

Additionally or alternatively, the touch-sensitive interface 240a and 240b and/or sensor 244a and 244b may be configured to detect the case 346. In these examples, upon detecting the case 346, an earbud 236a in the case 346 may transmit a message to an earbud 236b still in use indicating that earbud 236a is no longer in use.

Further, in some examples, the case 346 may include a processor, such as processor 112. The processor 112 may be configured to transmit messages indicating whether one or both earbuds 236a and/or 236b are charging to a control device 130a, for example. In an example where one earbud 236a is charging, the case 346 may be configured to transmit a message to the earbud 236b still in use that earbud 236a is charging. The case 346 may be configured to communicate wirelessly with the earbuds 236a and 236b and/or a control device 130a via a wireless network (e.g., a network, a Bluetooth, a Z-Wave network, a ZigBee, and/or other suitable wireless communication protocol network).

In some examples, the wearable playback device 210 may utilize different gesture profiles when operating in different modes based on different operating conditions (e.g., whether the user is wearing one or both headphones, different types of audio content, etc.). While in a first mode, the wearable playback device 210 may interpret certain gestures differently than in another mode (e.g., a second mode). In other words, the same gesture on the touch-sensitive interface 240a and 240b will cause the wearable playback device 210 to perform one function while operating a first mode and a different function while operating in a second mode.

For example, in an embodiment where the wearable playback device 210 is configured to operate in various modes based on whether a user is wearing or using one or both earbuds 236a and 236b, the user may initially be playing back audio on one earbud 236a. While the user is only using one earbud 236a, the wearable playback device 210 operates in a first mode (e.g., a "Single Earbud Mode"). A first gesture profile of the first mode, or Single Earbud Mode, may correlate one tap on the touch-sensitive interface 240a to toggling play and pause, two taps correlating to a skip forward function, three taps correlating to a skip backwards function, and tap-and-hold activating a voice assistant. FIG. 4A includes a table 460a illustrating an exemplary gesture profile for the single earbud mode.

The user may then switch to using both earbuds 236a and 236b. Upon detecting this change, the wearable playback device 210 may switch to a second operational mode (e.g., a "Dual Earbud Mode") using a second gesture profile. The second gesture profile may correlate one tap on the touch-sensitive interface 240a to toggle enabling and disabling ANC and/or ANR, two taps to toggling play and pause, three taps correlating to a skip forward function, and tap and hold to activating a voice assistant. In practice, this is desirable as the user is provided quick and easy access to the ANC or ANR functions while listening to both earbuds 236a and 236b, whereas a user may not need easy access to the ANC or ANR functions while only using one earbud 236a. The table 460a of FIG. 4A illustrates an exemplary gesture profile for the dual earbud mode. Many other examples of gesture profiles are possible.

Additionally, in an example embodiment where the wearable playback device 210 switches from a Single Earbud Mode to a Dual Earbud Mode, the wearable playback device 210 may apply the same gesture profile to both earbuds 236a and 236b. Alternatively, in some example embodiments, the wearable playback device 210 may apply different gesture profiles to each earbud 236a and 236b. For example, two taps on one earbud 236a (e.g., right earbud during use) may correlate to a skip forward function and two taps on the other earbud 236b (e.g., left earbud during use) may correlate to a skip backwards function.

Further, in a Dual Earbud Mode, the wearable playback device 210 may play back audio content in both the first earbud 236a and the second earbud 236b in synchrony. Conversely, while operating in a Single Earbud Mode, the wearable playback device 210 may play back audio content only in the earbud 236a in use. Namely, upon determining that one earbud 236b is not in use or is no longer in use (e.g., earbud 236b is charging in the case, sensor 244b no longer detects user, etc.) the earbud 236b may transmit a message to the earbud 236a, either directly or by way of a control device 130a as described above, that it is no longer in use or the earbud 236a may determine that the earbud 236b is no longer in use. The wearable playback device 210 may then transition to the Single Earbud Mode and only play back content in one earbud 236b.

Additionally or alternatively, one or both earbuds 236a and 236b may transmit a message to a paired control device, such as the control device 130a, indicating that one earbud 236b is no longer in use. In this example, the control device 130a may transmit instructions to one or both earbuds 236a and 236b to switch operational modes, gesture profiles, and/or to only playback audio content in the earbud 236a that is still in use. Further, the control device 130 may be configured to detect that one earbud 236a is no longer in use. For example, the control device 130 may be communicatively coupled to the earbuds 236a and 236b and may be configured to detect that one earbud 236a is no longer coupled to the control device 130.

In some examples, the user may manually change the operating modes, for example, by way of a control device, such as control device 130a. By way of example, the user may desire that the gesture profile of the Dual Earbud Mode described above be applied to the wearable playback device 210 while only listening to one earbud 236a. The user may manage the gesture profiles by way of a smartphone application, for example. Further, a user may create and/or modify a gesture profile by way of user input to a control interface on a smartphone application, for example, to be applied to the wearable playback device 210 during use or in certain operating conditions.

In another example, the wearable playback device 210 is configured to operate in various modes based on types of media content being played back. For example, the user may initially be playing back music. While the user is listening to music, the wearable playback device 210 may be operating in a first operational mode (e.g., "Music Mode") where the first gesture profile correlates two taps on the touch-sensitive interface 240a to toggling play and pause, among other gestures and commands. The user may then switch the media content to spoken word (e.g., an audiobook, a podcast, etc.). Upon detecting this change, the wearable playback device 210 may then switch to a second operational mode (e.g., "Spoken Word Mode") using a second gesture profile. The second gesture profile may correlate two taps on the touch-sensitive interface 240a and 240b to scanning forward 15 seconds and three taps to scanning backwards 15 seconds, among other gestures and commands. In practice, this is desirable as the user is provided quick and easy access to the scanning function while listening to spoken word content, whereas a user may not need as frequent access to the scanning function while listening to music. The table 460b of FIG. 4B illustrates exemplary gesture profiles for the music and spoken word modes. Many other examples of gesture profiles are possible.

Additionally or alternatively, the wearable playback device 210 may be configured to operate in various modes based on whether the audio content is associated with video content. For example, the user may initially be playing back music with no associated video content. While the user is listening to music, the wearable playback device 210 may be operating in a first operational mode (e.g., "Music Mode") where the first gesture profile correlates two taps on the touch-sensitive interface 240a to toggle play and pause, among other gestures and commands. The user may then switch to playing back audio content with associated video content. Upon detecting this change, the wearable playback device 210 may then switch to a second operational mode (e.g., "Video Mode") using a second gesture profile. The second gesture profile may correlate two taps on the touch-sensitive interface 240a and 240b to scanning forward 15 seconds and three taps to scanning backwards 15 seconds, among other gestures and commands. In practice, this is desirable as the user is provided quick and easy access to the scanning function while listening to and watching video content, whereas a user may not need to as frequent access to the scanning function while listening to music. The table 460c of FIG. 4C illustrates exemplary gesture profiles for the music and video modes. Many other examples of gesture profiles are possible.

In another example, the wearable playback device 210 is configured to operate in various modes based on various sources of audio content being played back. For example, the wearable playback device 210 may initially be playing back audio content from one media content service provider, (e.g., Spotify) and operating in a first operational mode (e.g., "First Source Mode") with a first gesture profile. The user may then switch to playback audio content from a different media content service provider (e.g., YouTube). Upon detecting the switch of the source of the audio content, the headphone device may switch to operating in a second mode with a second associated gesture profile (e.g., "Second Source Mode"). The table 460d of FIG. 4D illustrates exemplary gesture profiles for the first source and second source modes. Many other examples of gesture profiles are possible.

Further, in some embodiments various media streaming services (e.g., Apple Music, Spotify, etc.) may have preset gesture profiles. The earbuds 236a and 236b may, in some examples, by way of the control device 130, receive the preset gesture profile from the media streaming service and apply the gesture profile to the earbuds 236a and 236b.

Additionally or alternatively, a smartphone application (e.g., SONOS application) installed on the connected control device 130 may receive a preset gesture profile from the media streaming service (e.g., Apple Music, Spotify, etc.). The control device 130 may then apply the gesture profile to the earbuds 236a and 236b while the user is listening to that service.

Further, the wearable playback device 210 may transition operational modes and/or gesture profiles based on whether the source of media content (e.g., media content service provider) typical provides paired audio and video content. For example, the wearable playback device 210 may apply a first operational mode (e.g., "Music Mode") and first gesture profile for media service providers which typically provide audio content without associated video content (e.g., Spotify, Pandora, iTunes, etc.). The wearable playback device 210 may apply a second operational mode (e.g., "Video Mode") for media service providers which typically provide audio content with associated video content (e.g., YouTube, Netflix, Hulu, etc.).

In some examples, the streaming service (e.g., Spotify, Pandora, iTunes, etc.) can provide metadata including the type of content (e.g., music, video, podcast) to the earbuds 236a and 236b, charging case 346, control device 130, and/or the smartphone application. The earbuds 236a and 236b, charging case 346, control device 130, and/or the smartphone application can then apply the appropriate operational mode and/or gesture profile based on the metadata provided. For example, Spotify can provide metadata to the control device 130 that content to be streamed is a song. The control device 130 may then apply the "Music Mode" operational mode and the corresponding gesture profile.

In another example embodiment, the wearable playback device 210 may determine there is change in operating conditions when the wearable playback device 210 is paired to a new or different control device 130a. In one example, a user may have saved gesture profile settings for different control devices 130a. Upon detecting a change in the paired control device 130a, the wearable playback device 210 may change modes and/or gesture profiles based on saved settings. Further, the wearable playback device 210 could pair to a new control device 130a (i.e., a control device 130a not paired previously). In this example, the wearable playback device 210 may revert to default or factory settings for the operational mode and/or gesture profile.

Additionally or alternatively, the wearable playback device 210 may be configured to operate in different operational modes based on the type of control device 130a. For example, the wearable playback device 210 may operate in a first operational mode (e.g., "Mobile Device Pairing Mode") using a first gesture profile while paired with a mobile device (e.g., a smartphone) and may operate in a second operational mode (e.g., "Computing Pairing Mode") using a second gesture profile while paired with a different device, such as a computer or television. The table 460e of FIG. 4E illustrates exemplary gesture profiles for the mobile device pairing and computing pairing modes. Many other examples of gesture profiles are possible.

In some examples, the earbuds 236a and 236b may store and change the preset gesture profile (e.g., by way of the electronics 212). For example, the earbuds 236a and 236b may store first gesture profile for a first operational mode (e.g., "Mobile Device Pairing Mode") and a second gesture profile for a second operational mode (e.g., "Computing Pairing Mode"). A particular gesture (e.g., single tap) can change the resulting action or command (e.g., play, pause) depending on which operational mode is active.

Further, in some examples, certain commands can be controlled by the earbuds 236a and 236b (e.g., volume change). In these examples, the earbuds 236a and 236b may execute the command upon receiving input data representing the corresponding gesture without sending a message to the control device 130. Additionally or alternatively, the earbuds 236a and 236b may send a message to the control device 130 to execute the command in any of the manners described herein.

In some example embodiments, the control device 130 (e.g., a smartphone) or smartphone application can maintain which gesture profile and/or operational mode is currently active. In these examples, upon receiving input data corresponding to a gesture, the earbuds 236a and 236b may send a message to the device including the input data. The control device 130 may then determine the corresponding command based on the active gesture profile and/or operational mode. The control device 130 may then execute the command and/or send a message to the earbuds 236a and 236b to execute the command.

Further, in some example embodiments, the charging case 346 may determine and facilitate any changes in the active gesture profile and/or operational mode (e.g., the case 346 may determine that one earbud 236a is charging and the other earbud 236b is not charging). In these examples, the charging case 236 is communicatively coupled with both the earbuds 236a and 236b and the control device 130 (e.g., a smartphone). The charging case 346 can maintain and determine which gesture profile and/or operational mode is active. The charging case 346 can receive the input data corresponding to a gesture and determine what the corresponding command is based on which gesture profile and/or operational mode is active. The charging case 346 can then send a message to the earbuds 236a and 236b and/or the control device 130 to execute the command.

Additionally, in some example embodiments, a smartphone application and/or streaming service can apply a gesture profile and/or operational mode to the earbuds 236a and 236b. For example, the earbuds can send a message including input data corresponding to a gesture to a smartphone application and/or streaming service. The smartphone application and/or streaming service can then determine the action to take based on the active profile.

In some examples, the control device 130 and/or smartphone application can supplement preset commands with proprietary commands based on the gesture profile and/or command. For example, a smartphone application may have standard transport commands (e.g., play, pause, skip), but the earbuds 236a and 236b may have commands that map to non-standard commands (e.g., applying ANC). In these examples, the control device 130 and/or smartphone application can apply proprietary and/or commands to the gesture profile in lieu of standard commands or vice versa Further, the wearable playback device 210 may be configured to operate in different operational modes based on being grouped in a playback zone. An example gesture profile for operating in a playback zone may involve a gesture, such as two taps, correlating to muting the other playback devices in the playback zone while the wearable playback device 210 is paired. Additionally or alternatively, in these examples, the operational mode may involve outputting audio content only on the paired wearable playback device 210 and automatically muting the remaining playback devices in the playback zone. The table 460f of FIG. 4F illustrates exemplary gesture profiles for a playback device grouping and wearable playback device grouping modes. Many other examples of gesture profiles are possible.

Further, in some examples the earbuds 236a and 236b may be configured to operate in various modes based on various operating system settings. For example, the operating system installed on the control device 130 (e.g., IOS, Android) and/or the earbuds 236a and 236b may have different listening profiles built into it (e.g., a Bluetooth Advanced Audio Distribution Profile, a headset profile, etc.). In these examples, the operating system may include gesture profile information and apply a gesture profile to the earbuds 236a and 236b.

Additionally or alternatively, the wearable playback device 210 may be configured to operate in different operational modes based on being paired to one or more additional wearable playback devices 210. An example gesture profile for operating while being paired with another wearable playback device 210 may involve a gesture, such as two taps, correlating to synchronizing audio playback between the one or more paired headphone devices 200.

In some examples, the wearable playback device 210 may notify the user of the switch from a first operational mode to a second operational mode. For example, upon detecting that the user is only using one earbud 236a, the headphone device may output a prerecorded voice message indicating that the headphone device is switching to the Single Earbud Mode (e.g., "Now switching to Single Earbud Mode").

IV. Example Methods

Figure 5:
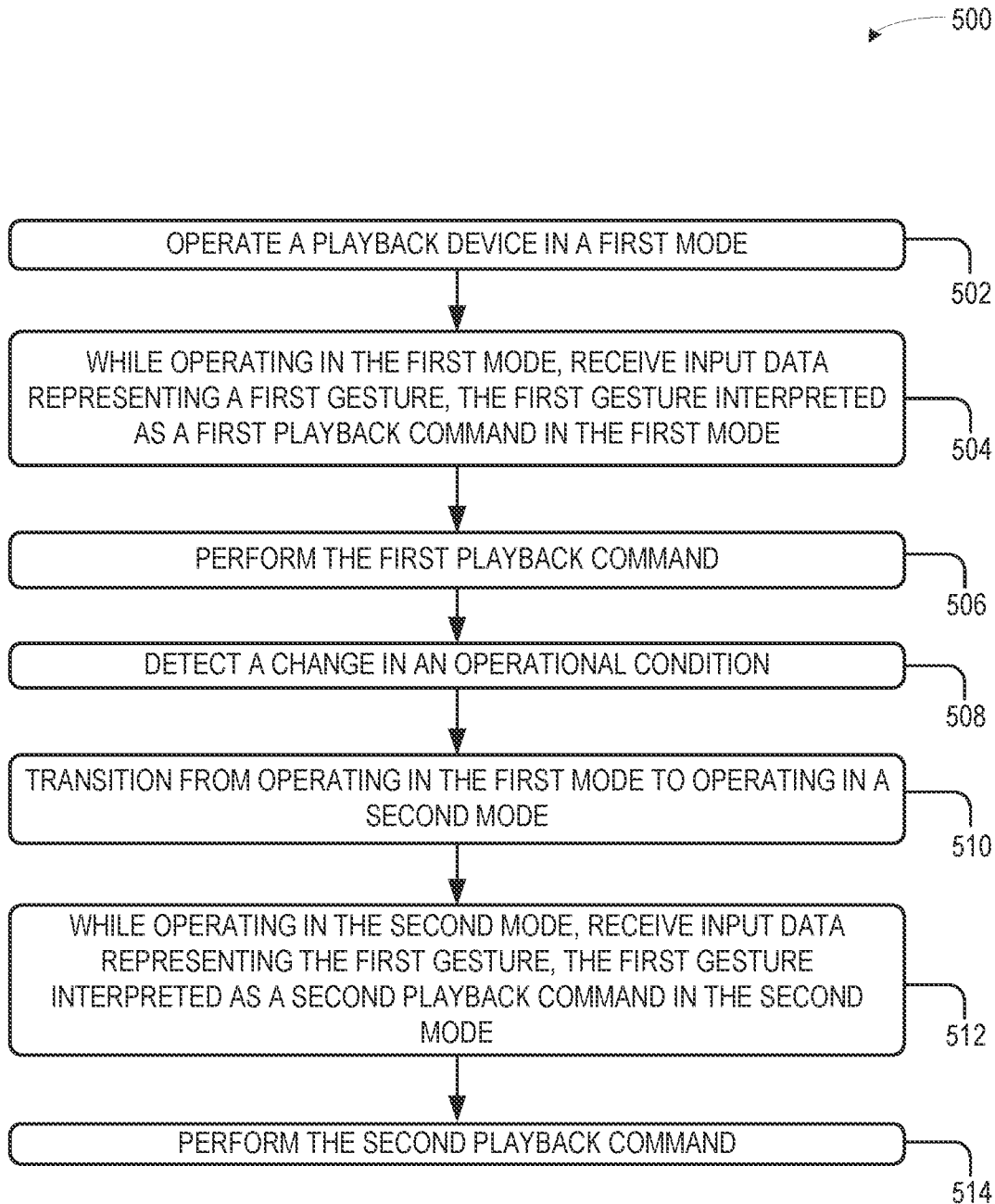
FIG. 5 is a flow chart of a method, according to an example embodiment.

As discussed above, in some examples, a headphone device is configured to operate in different modes based on various operational, playback or environmental conditions. FIG. 5 is a flow diagram showing an example method 500 to switch between gesture profiles based on a change in operational condition.

Method 500 can be implemented by any of the playback devices (e.g., the wearable playback device 210) disclosed herein, individually or in combination with any of the computing systems (e.g., computing system(s) 106) and/or control devices (e.g., the control devices 130) disclosed herein, or any other computing system(s) and/or control device(s) now known or later developed.

At block 502, the method includes operating in a first mode. For instance, the playback device 210 including earbuds 236a and 236b (FIG. 2) may operate in a first mode. In some examples, in the first mode, the first earbud 236a is configured to interpret a first set of gestures to the first touch-sensitive interface 240a as respective commands. Similarly, the second earbud 236b is configured to interpret a second set of gestures to the second touch-sensitive interface 240b as respective commands. The first set of gestures may include a first gesture and a second gesture and the second set of gestures may include the first gesture and a third gesture. The first mode may include—any of the exemplary modes shown in FIGS. 4A-4F, as well as other examples.

At block 504, the method 500 further includes receiving input data representing a first gesture while operating in the first mode. For instance, the playback device 210 including earbud 236b may receive, via a second touch-sensitive interface 240b (FIG. 2), input data representing a first gesture, while operating in first mode. In some examples, when operating in the first mode, the second earbud 236b interprets the first gesture as a first playback command. Example playback commands include transport controls, volume controls, and other types of playback device commands, such as the commands illustrated in the gesture profiles of FIGS. 4A-4F.

At block 506, method 500 further includes performing the first playback command. For instance, the wearable playback device 210 may perform the first playback command in response to receiving the input data representing a first gesture. In some cases, one of the earbuds (e.g., the second earbud 236b) may send data representing instructions to another earbud (e.g., the first earbud 236a) to perform the first playback command.

At block 508, method 500 further includes detecting a change in an operational condition. For instance, the wearable playback device 210 may detect a change in an operational condition using any of techniques discussed above in connection with the wearable playback device 210, such as via the sensors 244.

As discussed above in connection with FIG. 2, the first earbud 236a includes a sensor 244a configured to detect whether the first earbud 236a is in use. Detecting the change in the operational condition may include the second earbud 236b receiving, from the first earbud 236a, one or more messages indicating that the first earbud 236a is not in use. Further, the block 508 may include detecting that a battery of the first earbud 236a is charging from a charging case 346 (FIG. 3) configured to carry the first earbud 236a and the second earbud 236b.

Additionally, in some examples, block 508 further includes detecting a transition from playing back a first type of audio content to playing back a second type of audio content. For instance, the playback device may detect a content-related condition such as a music, spoken word, or audio with video using an analysis of the audio content itself or via associated metadata. Alternatively, the control device 130a may detect a change in operational condition and send one or more messages to the wearable playback device 210 indicating such a condition.

Moreover, in some examples, the block 508 further includes the playback device being paired to a first mobile device 130a (FIG. 1H) while in the first mode, and wherein detecting the change in the operational condition comprises detecting a transition from being paired with the first mobile device to being paired with a second mobile device 130b.

At block 510, method 500 further includes transitioning from operating in the first mode to operating in a second mode. For instance, the playback device 210 may transition from operating in the first mode to operating in a second mode, in response to detecting the change in the operational condition. The second mode may include any of the exemplary modes shown in FIGS. 4A-4F, as well as other examples At block 512, method 500 further includes while operating in the second mode, receiving input data representing the first gesture. For instance, the playback device 210 may receive, via the second touch-sensitive interface 240b, input data representing the first gesture. When operating in the second mode, the second earbud 236b interprets the first gesture as a second playback command. In some examples, the second playback command is different from the first playback command, as illustrated by FIGS. 4A-4F.

At block 514, method 500 further includes performing the second playback command. For instance, the playback device 210 may, in response to receiving the input data representing the first gesture, perform the second playback command.

In some embodiments, the method 500 may further include playing back audio in the first earbud 236a and the second earbud 236b in synchrony while operating in the first mode. That is the earbuds may both be playing back the same content. Then, when detecting a change in the operational condition (e.g., that the first earbud 236a is not in use), the first earbud 236a may stop playing the audio content while the second earbud continues to play back the audio content.

Further, in some examples, playing back the audio content may include the first earbud 236a playing back a first channel of the audio and the second earbud 236b playing back a second channel of the audio (e.g., left and right stereo channels). When detecting a change in the operational condition (e.g., that the first earbud 236a is not in use), the first earbud 236a may stop playing the audio content while the second earbud continues to play back the audio content and while operating in the second mode, the second earbud 236b plays back a mix of the first channel and the second channel while the first earbud 236a is not playing back the audio.

VIII. CONCLUSION

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

It should be appreciated that the dynamic profile techniques may be readily applied to devices separate and apart from playback devices and/or NMDs. For example, the techniques described herein may be employed in wearable devices separate and apart from headphone devices such as a pair of smart glasses.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method to be performed by a playback device comprising: a first earbud comprising a first touch-sensitive interface; and a second earbud communicatively coupled wirelessly to the first earbud, wherein the second earbud comprises a second touch-sensitive interface, a processor, and data storage having instructions encoded therein, wherein the instructions, when executed by the processor, cause the second earbud to perform the method. The method comprises: operating in a first mode, wherein in the first mode, the first earbud is configured to interpret a first set of gestures to the first touch-sensitive interface as respective commands and the second earbud is configured to interpret a second set of gestures to the second touch-sensitive interface as respective commands, wherein the first set of gestures comprises a first gesture and a second gesture, and wherein the second set of gestures comprises the first gesture and a third gesture; while operating in the first mode, receiving, via the second touch-sensitive interface, input data representing a first gesture, wherein, when operating in the first mode, the second earbud interprets the first gesture as a first playback command; in response to receiving the input data representing a first gesture, performing the first playback command; detecting a change in an operational condition; in response to detecting the change in the operational condition, transitioning from operating in the first mode to operating in a second mode; while operating in the second mode, receiving, via the second touch-sensitive interface, input data representing the first gesture, wherein when operating in the second mode, the second earbud interprets the first gesture as a second playback command, the second playback command different from the first playback command; and in response to receiving the input data representing the first gesture, performing the second playback command Example 2: The method of example 1, wherein the first earbud and the second earbud play back audio in synchrony while operating in the first mode, wherein detecting the change in the operational condition comprises detecting that the first earbud is not in use.

Example 3: The method of example 2, wherein playing back the audio content comprises the first earbud playing back a first channel of the audio and the second earbud playing back a second channel of the audio, and wherein the functions further comprise: while operating in the second mode, the second earbud playing back a mix of the first channel and the second channel while the first earbud is not playing back the audio.

Example 4: The method of example 2, wherein the first earbud comprises a sensor configured to detect whether the first earbud is in use, and wherein detecting the change in the operational condition comprises receiving, from the first earbud, one or more messages indicating that the first earbud is not in use.

Example 5: The method of example 4, wherein detecting that the first earbud is not in use comprises detecting that a battery of the first earbud is charging from a charging case configured to carry the first earbud and the second earbud.

Example 6: The method of example 1, wherein the first playback command is a play/pause command, wherein performing the first playback command comprises toggling a playback state between a playing state and a paused state, wherein the second playback command is an active noise cancelling enable/disable toggle, and wherein performing the second playback command comprises toggling active noise cancelling between an enabled state and a disabled state.

Example 7: The method of any of examples 1-6, wherein the first earbud comprises a second processor and data storage having instructions encoded therein, wherein the instructions, when executed by the second processor, cause the first earbud to perform functions comprising: in response to determining the change in the operational condition, transitioning from operating in the first mode to operating in a second mode, wherein when operating in the second mode, the first earbud interprets the first gesture as the second playback command.

Example 8: The method of any of examples 1-7, wherein detecting the change in the operational condition comprises: detecting a transition from playing back a first type of audio content to playing back a second type of audio content.

Example 9: The method of example 8, wherein the first type of audio content is music and wherein the second type of audio content is spoken word.

Example 10: The method of example 8, wherein the first playback command is a skip forward command, wherein performing the first playback command comprises skipping forward to a next audio track in a playback queue, wherein the second playback command is a shuffle command, and wherein performing the second playback command comprises scanning forward by a pre-determined duration in a given audio content.

Example 11: The method of any of examples 1-10, wherein the playback device is paired to a first mobile device while in the first mode, and wherein detecting the change in the operational condition comprises detecting a transition from being paired with the first mobile device to being paired with a second mobile device.

Example 12: A tangible, non-transitory, computer-readable medium having instructions stored thereon that are executable by one or more processors to cause a playback device to perform the method of any one of Examples 1-11.

Example 13: A playback device comprising: a first earbud comprising a first touch-sensitive interface; and a second earbud communicatively coupled wirelessly to the first earbud, wherein the second earbud comprises a second touch-sensitive interface, a processor, and a data storage having instructions stored thereon that are executable by the one or more processors to cause the playback device to perform the method of any of Examples 1-11.

Example 14: A system comprising a wearable playback device, the system configured to perform the method of any of Examples 1-11.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:
   a first earbud; and
   a second earbud communicatively coupled wirelessly to the first earbud,
   wherein the first earbud comprises a first user interface, a processor, and data storage having instruction code stored thereon that, when executed by the processor, causes the first earbud to perform operations comprising:
      while operating in a first mode in which the playback device is configured to play back audio content received from a first content source via the first earbud and the second earbud, and after receiving, via the first user interface, input data representing a first gesture, performing a first playback command;
      after the playback device is configured to play back audio content received from a second source via the first earbud and the second earbud, transitioning from operating in the first mode to operating in a second mode; and
      while operating in the second mode, and after receiving, via the first user interface, input data representing the first gesture, performing a second playback command that is different from the first playback command that is performed in the first mode.

2. The playback device of claim 1, wherein the instruction code that causes the first earbud to transition from operating in the first mode to operating in the second mode after the playback device is configured to play back audio content received from a second source via the first earbud and the second earbud, causes the first earbud to perform operations comprising:
   after the playback device transitions from playing back video-content-synchronized audio content via the first earbud and the second earbud to playing back non-video-content-synchronized audio content via the first earbud and the second earbud, transitioning from operating in the first mode to operating in a second mode.

3. The playback device of claim 1, wherein the instruction code that causes the first earbud to transition from operating in the first mode to operating in a second mode after the playback device is configured to play back audio content received from a second source via the first earbud and the second earbud, causes the first earbud to perform operations comprising:

after the playback device transitions from playing back audio content from a first content provider via the first earbud and the second earbud to playing back audio content from a second content provider via the first earbud and the second earbud, transitioning from operating in the first mode to operating in a second mode.

4. The playback device of claim 3, wherein the instruction code causes the first earbud to perform operations comprising:
   when operating in the first mode, operating according to a first gesture profile that is received by the playback device and that is downloaded from the first content provider; and
   when operating in the second mode, operating according to a second gesture profile that is received by the playback device and that is downloaded from the second content provider.

5. The playback device of claim 1, wherein the first earbud and the second earbud play back audio content in synchrony while operating in the first mode.

6. The playback device of claim 5, wherein playing back the audio content comprises the first earbud playing back a first channel of the audio content and the second earbud playing back a second channel of the audio content, and wherein the operations further comprise:
   while operating in the second mode, the second earbud playing back a mix of the first channel and the second channel while the first earbud is not playing back the audio content.

7. The playback device of claim 1, wherein the first playback command is a play/pause command, wherein performing the first playback command comprises toggling a playback state between a playing state and a paused state, wherein the second playback command is an active noise canceling enable/disable toggle, and wherein performing the second playback command comprises toggling active noise cancelling between an enabled state and a disabled state.

8. The playback device of claim 1, wherein the first playback command is a skip forward command, wherein performing the first playback command comprises skipping forward to a next audio track in a playback queue, wherein the second playback command is a shuffle command, and wherein performing the second playback command comprises scanning forward by a pre-determined duration in a given audio content.

9. The playback device of claim 1, wherein the second earbud comprises a second processor and data storage having instruction code stored thereon that, when executed by the second processor, causes the second earbud to perform operations comprising:
   after the playback device is configured to play back content received from the second source via the first earbud and the second earbud, transitioning from operating in the first mode to operating in the second mode, wherein when operating in the second mode, the second earbud interprets the first gesture as the second playback command.

10. Tangible, non-transitory computer-readable media comprising instruction code that, when executed by a processor of a first earbud of a playback device, causes the first earbud to perform operations comprising:
    while operating in a first mode in which the playback device is configured to play back audio content received from a first content source via the first earbud and a second earbud of the playback device, and after receiving, via a first user interface of the first earbud, input data representing a first gesture, performing a first playback command;
    after the playback device is configured to play back audio content received from a second source via the first earbud and the second earbud, transitioning from operating in the first mode to operating in a second mode; and
    while operating in the second mode, and after receiving, via the first user interface of the first earbud, input data representing the first gesture, performing a second playback command that is different from the first playback command that is performed in the first mode.

11. The playback device of claim 10, wherein the instruction code that causes the first earbud to transition from operating in the first mode to operating in a second mode after the playback device is configured to play back audio content received from a second source via the first earbud and the second earbud, causes the first earbud to perform operations comprising:
    after the playback device transitions from playing back video-content-synchronized audio content via the first earbud and the second earbud to playing back non-video-content-synchronized audio content via the first earbud and the second earbud, transitioning from operating in the first mode to operating in a second mode.

12. The playback device of claim 10, wherein the instruction code that causes the first earbud to transition from operating in the first mode to operating in a second mode after the playback device is configured to play back audio content received from a second source via the first earbud and the second earbud, causes the first earbud to perform operations comprising:
    after the playback device transitions from playing back audio content from a first content provider via the first earbud and the second earbud to playing back audio content from a second content provider via the first earbud and the second earbud, transitioning from operating in the first mode to operating in a second mode.

13. The playback device of claim 12, wherein the instruction code causes the first earbud to perform operations comprising:
    when operating in the first mode, operating according to a first gesture profile that is received by the playback device and that is downloaded from the first content provider; and
    when operating in the second mode, operating according to a second gesture profile that is received by the playback device and that is downloaded from the second content provider.

14. The playback device of claim 10, wherein the first earbud and the second earbud play back audio content in synchrony while operating in the first mode.

15. The playback device of claim 14, wherein playing back the audio content comprises the first earbud playing back a first channel of the audio content and the second earbud playing back a second channel of the audio content, and wherein the operations further comprise:
    while operating in the second mode, the second earbud playing back a mix of the first channel and the second channel while the first earbud is not playing back the audio content.

16. The playback device of claim 10, wherein the first playback command is a play/pause command, wherein performing the first playback command comprises toggling a playback state between a playing state and a paused state, wherein the second playback command is an active noise canceling enable/disable toggle, and wherein performing the second playback command comprises toggling active noise cancelling between an enabled state and a disabled state.

17. The playback device of claim 10, wherein the first playback command is a skip forward command, wherein performing the first playback command comprises skipping forward to a next audio track in a playback queue, wherein the second playback command is a shuffle command, and wherein performing the second playback command comprises scanning forward by a pre-determined duration in a given audio content.

18. The playback device of claim 10, wherein the second earbud comprises a second processor and data storage having instruction code stored thereon that, when executed by the second processor, causes the second earbud to perform operations comprising:
  after the playback device is configured to play back content received from the second source via the first earbud and the second earbud, transitioning from operating in the first mode to operating in the second mode, wherein when operating in the second mode, the second earbud interprets the first gesture as the second playback command.

19. A method comprising:
  while operating in a first mode in which a playback device is configured to play back audio content received from a first content source via a first earbud and a second earbud of the playback device, and after receiving, via a first user interface of the first earbud, input data representing a first gesture, performing, by the first earbud, a first playback command;
  after the playback device is configured to play back audio content received from a second source via the first earbud and the second earbud, transitioning the first earbud from operating in the first mode to operating in a second mode; and
  while operating in the second mode, and after receiving, via the first user interface of the first earbud, input data representing the first gesture, performing, by the first earbud, a second playback command that is different from the first playback command that is performed in the first mode.

20. The method of claim 19, wherein transitioning the first earbud from operating in the first mode to operating in the second mode after the playback device is configured to play back audio content received from the second source via the first earbud and the second earbud comprises:
  after the playback device transitions from playing back video-content-synchronized audio content via the first earbud and the second earbud to playing back non-video-content-synchronized audio content via the first earbud and the second earbud, transitioning the first earbud from operating in the first mode to operating in a second mode.

* * * * *